United States Patent
Venkatasurya et al.

(10) Patent No.: US 10,954,580 B2
(45) Date of Patent: Mar. 23, 2021

(54) METHOD FOR PRODUCING A HIGH STRENGTH STEEL SHEET HAVING IMPROVED STRENGTH AND FORMABILITY, AND OBTAINED HIGH STRENGTH STEEL SHEET

(71) Applicant: ArcelorMittal, Luxembourg (LU)

(72) Inventors: Pavan Venkatasurya, East Chicago, IN (US); Hyun Jo Jun, East Chicago, IN (US)

(73) Assignee: ARCELORMITTAL, Luxembourg (LU)

( * ) Notice: Subject to any disclaimer, the term of this patent is extended or adjusted under 35 U.S.C. 154(b) by 207 days.

(21) Appl. No.: 16/064,545

(22) PCT Filed: Dec. 21, 2016

(86) PCT No.: PCT/EP2016/082202
§ 371 (c)(1),
(2) Date: Jun. 21, 2018

(87) PCT Pub. No.: WO2017/108966
PCT Pub. Date: Jun. 29, 2017

(65) Prior Publication Data
US 2019/0003007 A1    Jan. 3, 2019

(30) Foreign Application Priority Data

Dec. 21, 2015  (WO) .................. PCT/IB2015/059838

(51) Int. Cl.
| | |
|---|---|
| *C21D 9/46* | (2006.01) |
| *C21D 8/02* | (2006.01) |
| *C22C 38/06* | (2006.01) |
| *C22C 38/60* | (2006.01) |
| *B32B 15/01* | (2006.01) |
| *C21D 1/18* | (2006.01) |
| *C21D 6/00* | (2006.01) |
| *C22C 38/02* | (2006.01) |
| *C22C 38/04* | (2006.01) |

(52) U.S. Cl.
CPC .............. *C21D 9/46* (2013.01); *B32B 15/013* (2013.01); *C21D 1/18* (2013.01); *C21D 6/005* (2013.01); *C21D 6/008* (2013.01); *C21D 8/0205* (2013.01); *C21D 8/0236* (2013.01); *C21D 8/0247* (2013.01); *C22C 38/02* (2013.01); *C22C 38/04* (2013.01); *C22C 38/06* (2013.01); *C22C 38/60* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 6,743,307 B1 | 6/2004 | Engl et al. | |
| 7,976,647 B2 | 7/2011 | Moulin et al. | |
| 9,121,087 B2 | 9/2015 | Matsuda et al. | |
| 9,290,834 B2 | 3/2016 | Hasegawa et al. | |
| 2002/0197505 A1 | 12/2002 | Shigekuni et al. | |
| 2010/0307644 A1 | 12/2010 | Gil Otin et al. | |
| 2011/0146852 A1* | 6/2011 | Matsuda | C21D 6/00 148/533 |
| 2011/0162762 A1 | 7/2011 | Matsuda et al. | |
| 2011/0186189 A1 | 8/2011 | Futamura | |
| 2011/0198002 A1* | 8/2011 | Nakagaito | C21D 6/008 148/533 |
| 2012/0031528 A1 | 2/2012 | Hayashi et al. | |
| 2012/0312433 A1 | 12/2012 | Mizuta et al. | |
| 2013/0167980 A1 | 7/2013 | Kawata et al. | |
| 2014/0322559 A1 | 10/2014 | Becker et al. | |
| 2014/0377584 A1* | 12/2014 | Hasegawa | C22C 38/001 428/659 |
| 2015/0086808 A1 | 3/2015 | Kasuya et al. | |
| 2015/0203946 A1* | 7/2015 | Hammer | C21D 6/004 148/602 |
| 2015/0203947 A1* | 7/2015 | Hasegawa | C21D 8/0205 428/659 |
| 2015/0218684 A1* | 8/2015 | Hammer | C21D 6/002 148/537 |
| 2016/0186286 A1* | 6/2016 | Lee | C22C 38/04 148/661 |
| 2016/0201157 A1* | 7/2016 | Hammer | C21D 9/46 148/506 |
| 2017/0137908 A1 | 5/2017 | Fan et al. | |
| 2017/0369966 A1* | 12/2017 | Lee | C22C 38/02 |

FOREIGN PATENT DOCUMENTS

| | | |
|---|---|---|
| CN | 1386903 A | 12/2002 |
| CN | 1990894 A | 7/2007 |

(Continued)

*Primary Examiner* — Xiaobei Wang

(74) *Attorney, Agent, or Firm* — Davidson, Davidson & Kappel, LLC

(57) ABSTRACT

A method for producing a steel sheet having a microstructure including 71% to 91% martensite and bainite, 9% to 13% retained austenite, and at most 20% ferrite is provided. The method includes providing a cold-rolled steel sheet including, in weight percent: 0.13%≤C≤0.22%, 1.2%≤Si≤2.3%, 0.02%≤Al≤1.0%, with 1.25%≤Si+Al≤2.35%, 2.4%≤Mn≤3%, Ti≤0.05%, Nb≤0.05% and a remainder of Fe and unavoidable impurities, annealing the steel sheet to obtain 80% to 100% austenite and 0% to 20% ferrite, quenching the steel sheet at a cooling rate between 20° C./s and 50° C./s to a quenching temperature between 240° C. and 310° C., heating the steel sheet to a partitioning temperature between 400° C. and 465° C. and maintaining the steel sheet at the partitioning temperature for 50 to 250 seconds, then immediately cooling the sheet to room temperature. Steel sheets are also provided.

28 Claims, No Drawings

(56) References Cited

FOREIGN PATENT DOCUMENTS

| | | |
|---|---|---|
| CN | 102149841 A | 8/2011 |
| EP | 1676932 A1 | 5/2006 |
| EP | 1990431 C2 | 11/2008 |
| EP | 2267176 A1 | 12/2010 |
| EP | 2325346 A1 | 5/2011 |
| EP | 2524970 A1 | 11/2012 |
| EP | 2757171 A1 | 7/2014 |
| EP | 2881481 A1 | 6/2015 |
| JP | 2001192768 A | 7/2001 |
| JP | 2006083403 A | 3/2006 |
| JP | 2007231311 A | 9/2007 |
| JP | 2010090450 A | 4/2010 |
| JP | 2010126770 A | 6/2010 |
| JP | 2012021225 A | 2/2012 |
| JP | 2012240095 A | 12/2012 |
| JP | 2013014828 A | 1/2013 |
| JP | 2013019047 A | 1/2013 |
| JP | 2014009388 A | 1/2014 |
| JP | 2014019928 A | 2/2014 |
| JP | 2015224359 A | 12/2015 |
| RU | 2321667 C2 | 4/2008 |
| RU | 2485202 C1 | 6/2013 |
| RU | 2524743 C2 | 8/2014 |
| WO | WO0109396 A1 | 2/2001 |
| WO | 2004022794 A1 | 3/2004 |
| WO | WO2012036269 A1 | 3/2012 |
| WO | WO2013146148 A1 | 10/2013 |
| WO | 2014020640 A1 | 2/2014 |
| WO | 2016001708 A1 | 1/2016 |

\* cited by examiner

METHOD FOR PRODUCING A HIGH STRENGTH STEEL SHEET HAVING IMPROVED STRENGTH AND FORMABILITY, AND OBTAINED HIGH STRENGTH STEEL SHEET

The present invention relates to a method for producing a high strength steel sheet having improved strength, ductility and formability and to the sheets obtained with the method.

BACKGROUND

To manufacture various equipments such as parts of body structural members and body panels for automotive vehicles, it is usual to use sheets made of DP (dual phase) steels or TRIP (transformation induced plasticity) steels.

For example, such steels which include a martensitic structure and/or retained austenite, and which contain about 0.2% of C, about 2% of Mn, about 1.7% of Si have a yield strength of about 750 MPa, a tensile strength of about 980 MPa, a total elongation of more than 8%. These sheets are produced on continuous annealing line by quenching from an annealing temperature higher than $Ac_3$ transformation point, down to an overaging above Ms transformation point and maintaining the sheet at the temperature for a given time.

BRIEF SUMMARY OF THE INVENTION

To reduce the weight of the automotive in order to improve their fuel efficiency in view of the global environmental conservation it is desirable to have sheets having improved yield and tensile strength. But such sheets must also have a good ductility and a good formability and more specifically a good stretch flangeability.

In this respect, it is desirable to have sheets having a yield strength YS comprised between 830 MPa and 1100 MPa, preferably at least 850 MPa, a tensile strength TS of at least 1180 MPa, a total elongation of at least 12%, and preferably of at least 14%, and a hole expansion ratio HER according to ISO standard 16630:2009 of more than 30%. It must be emphasized that, due to differences in the methods of measure, the values of hole expansion ratio HER according to the ISO standard are very different and not comparable to the values of the hole expansion ratio λ according to the JFS T 1001 (Japan Iron and Steel Federation standard). The tensile strength TS and the total elongation TE are measured according to ISO standard ISO 6892-1, published in October 2009. Due to differences in the methods of measurement, in particular due to differences in the geometry of the specimen used, the values of the total elongation TE measured according to the ISO standard are very different, in particular lower, than the values of the total elongation measured according to the JIS Z 2201-05 standard.

Therefore, an object of the present invention is to provide such a sheet and a method to produce the sheet.

The present invention provides a method for producing a steel sheet having a microstructure consisting of between 71% and 91% of the sum of martensite and bainite, between 9% and 13% of retained austenite, and at most 20% of ferrite, the method comprising the following successive steps:
  providing a cold-rolled steel sheet having a chemical composition of the steel containing in weight %:
  0.13%≤C≤0.22%
  1.2%≤Si≤2.3%
  0.02%≤Al≤1.0%,
  with 1.25%≤Si+Al≤2.35%,
  2.4%≤Mn 3%,
  Ti≤0.05%
  Nb≤0.05%
  the remainder being Fe and unavoidable impurities,
    annealing the steel sheet at an annealing temperature $T_A$ so as to obtain a structure comprising from 80% to 100% of austenite and from 0% to 20% of ferrite,
    quenching the sheet at a cooling rate comprised between 20° C./s and 50° C./s down to a quenching temperature QT between 240° C. and 310° C.,
    heating the sheet up to a partitioning temperature PT between 400° C. and 465° C. and maintaining the sheet at this temperature for a partitioning time Pt between 50 s and 250 s,
    immediately cooling the sheet down to the room temperature.

Preferably, the step of providing the cold-rolled steel sheet comprises:
  hot rolling a sheet made of said steel to obtain a hot rolled steel sheet,
  coiling said hot-rolled steel sheet at a temperature Tc comprised between 500° C. and 730° C.,
  cold rolling said hot-rolled steel sheet to obtain said cold-rolled steel sheet.

According to a preferred embodiment, the step of providing said cold-rolled steel sheet further comprises, between the coiling and the cold-rolling, performing a batch annealing at a temperature comprised between 500° C. and 650° C. for a time between 300 seconds and 12 hours.

According to another preferred embodiment, the step of providing said cold-rolled steel sheet further comprises, between the coiling and the cold-rolling, performing a slow cooling of the hot-rolled steel sheet from the coiling temperature to room temperature for a time comprised between 5 and 7 days.

Preferably, the quenched sheet has, just before the heating to the partitioning temperature PT, a structure consisting of between 10 and 40% of austenite, between 60% and 90% of martensite, and between 0% and 20% of ferrite.

According to a preferred embodiment, the quenching temperature QT is comprised between 240° C. and 270° C., and the partitioning temperature PT is comprised between 440° C. and 460° C.

According to another preferred embodiment, the quenching temperature QT is comprised between 290° C. and 320° C., and the partitioning temperature PT is comprised between 400° C. and 425° C.

Preferably, the chemical composition of the steel satisfies at least one of the following conditions: C≥0.16%, C≤0.20%, Si≥2.0%, Si≤2.2%, Mn≥2.6%, Mn≤2.8%.

Preferably, after the sheet is quenched to the quenching temperature QT and before the sheet is heated to the partitioning temperature PT, the sheet is held at the quenching temperature QT for a holding time comprised between 2 s and 8 s, preferably between 3 s and 7 s.

Preferably, the partitioning time Pt is between 50 and 200 s.

The present invention also provides a method for producing a steel sheet having a microstructure consisting of between 71% and 91% of the sum of martensite and bainite, between 9% and 13% of retained austenite, and at most 20% of ferrite, wherein the method comprises the following successive steps:
  providing a cold-rolled steel sheet, the chemical composition of the steel containing in weight %:
  0.13%≤C≤0.22%

1.2%≤Si≤2.3%
0.02%≤Al≤1.0%,
with 1.25%≤Si+Al≤2.35%,
2.4%≤Mn≤3%,
Ti<0.05%
Nb<0.05%
the remainder being Fe and unavoidable impurities,
  annealing the steel sheet at an annealing temperature TA so as to obtain a structure comprising from 80% to 100% of austenite and from 0% to 20% of ferrite,
  quenching the sheet at a cooling rate comprised between 20° C./s and 50° C./s down to a quenching temperature QT between 240° C. and 270° C.,
  heating the sheet up to a partitioning temperature PT between 440° C. and 460° C. and maintaining the sheet at the partitioning temperature PT for a partitioning time Pt between 50 s and 250 s,
  immediately cooling the sheet down to the room temperature.

The invention also provides a method for producing a steel sheet having a microstructure consisting of between 71% and 91% of the sum of martensite and bainite, between 9% and 13% of retained austenite, and at most 20% of ferrite, wherein the method comprises the following successive steps:
  providing a cold-rolled steel sheet, the chemical composition of the steel containing in weight %:
    0.13%≤C≤0.22%
    1.2%≤Si≤2.3%
    0.02%≤Al≤1.0%,
    with 1.25%≤Si+Al≤2.35%,
    2.4%≤Mn≤3%,
    Ti<0.05%
    Nb<0.05%
the remainder being Fe and unavoidable impurities,
  annealing the steel sheet at an annealing temperature TA so as to obtain a structure comprising from 80% to 100% of austenite and from 0% to 20% of ferrite,
  quenching the sheet at a cooling rate comprised between 20° C./s and 50° C./s down to a quenching temperature QT between 290° C. and 320° C.,
  heating the sheet up to a partitioning temperature PT between 400° C. and 425° C. and maintaining the sheet at the partitioning temperature PT for a partitioning time Pt between 50 s and 250 s,
  immediately cooling the sheet down to the room temperature.

The invention also provides a steel sheet, wherein the chemical composition of the steel contains in weight %:
  0.13%≤C≤0.22%
  1.2%≤Si≤2.3%
  0.02%≤Al≤1.0%,
  with 1.25%≤Si+Al≤2.35%,
  2.4%≤Mn≤3%,
  Ti≤0.05%
  Nb≤0.05%
the remainder being Fe and unavoidable impurities, having a microstructure consisting of, in surface percentage:
between 71% and 91% of martensite and bainite,
between 9% and 13% of retained austenite,
at most 20% of ferrite,
the sheet having a yield strength comprised between 850 and 1100 MPa, a tensile strength of at least 1180 MPa, a total elongation of at least 12% and a hole expansion ratio HER of at least 30%.

In a preferred embodiment, the total elongation TE is at least 14%, and/or the hole expansion ratio HER is greater than 40%.

The chemical composition of the steel can, optionally, satisfy at least one of the following conditions: C≥0.16%, C≤0.20%, Si≥2.0%, Si≤2.2%, Mn≥2.6% and Mn≤2.8%.

Preferably, the C content $C_{RA}$% in the retained austenite is comprised between 0.9% and 1.2%.

In another preferred embodiment, the retained austenite comprises blocky retained austenite having an aspect ratio comprised between 2 and 4 and film-type retained austenite having an aspect ratio comprised between 5 and 8.

Preferably, the microstructure comprises between 5.5% and 10.5% of film-type retained austenite.

In one preferred embodiment, the sheet is coated with a metallic coating fabricated by electroplating or vacuum deposition process.

The present invention also provides a steel sheet, wherein the chemical composition of the steel contains in weight %:
  0.13%≤C≤0.22%
  1.2%≤Si≤2.3%
  0.02%≤Al≤1.0%,
  with 1.25%≤Si+Al≤2.35%,
  2.4%≤Mn≤3%,
  Ti<0.05%
  Nb<0.05%
the remainder being Fe and unavoidable impurities, having a microstructure consisting of, in surface percentage:
between 71% and 91% of martensite and bainite,
between 9% and 13% of retained austenite,
at most 20% of ferrite,
wherein the retained austenite comprises blocky retained austenite having an aspect ratio comprised between 2 and 4 and film-type retained austenite having an aspect ratio comprised between 5 and 8,
the sheet having a yield strength comprised between 850 and 1100 MPa, a tensile strength of at least 1180 MPa, a total elongation of at least 14% and a hole expansion ratio HER of at least 30%.

DETAILED DESCRIPTION

The invention will now be described in details but without introducing limitations.

The composition of the steel according to the invention comprises, in weight percent:
  0.13 to 0.22% of carbon for ensuring a satisfactory strength and improving the stability of the retained austenite which is necessary to obtain a sufficient elongation. Preferably, the carbon content is higher than or equal to 0.16%, and preferably lower than or equal to 0.20%. If the carbon content is too high, the hot rolled sheet is too hard to cold roll and the weldability is insufficient. If the carbon content is below 0.13%, yield and tensile strength levels will not reach respectively 850 and 1180 MPa.
  2.4% to 3% and preferably more than 2.6% and preferably less than 2.8% of manganese. The minimum is defined to have a sufficient hardenability in order to obtain a microstructure containing at least 71% of martensite and bainite, and a tensile strength of more than 1180 MPa. The maximum is defined to avoid having segregation issues which are detrimental for the ductility.
  1.2% to 2.3% of silicon in order to stabilize the austenite, to provide a solid solution strengthening and to delay the formation of carbides during overaging without formation of silicon oxides at the surface of the sheet which would be detrimental to coatability. Preferably, the silicon content is higher than or equal to 1.9%, still preferably higher than or equal to 2.0%. An increased amount of silicon improves the hole expansion ratio. Preferably, the silicon content is lower than or equal to 2.2%. A silicon content above 2.3% would lead to formation of silicon oxides at the surface.

0.02% to 1.0% of aluminum. Aluminum is added to deoxidize the liquid steel and it increases the robustness of the manufacturing method, in particular reduces the variations of the austenite fraction when the annealing temperature varies. The maximum aluminum content is defined to prevent an increase of the $Ac_3$ transformation point to a temperature which would render the annealing more difficult. Aluminum, as silicon, delays the formation of carbides during carbon redistribution from martensite to austenite resulting from the overaging. To delay the formation of carbides the minimum content of Al+Si should be 1.25%. The maximum content of Al+Si should be 2.35%.

The balance is iron and residual elements resulting from the steelmaking. In this respect, Ni, Cr, Mo, Cu, Nb, Ti, V, B, S, P and N at least are considered as residual elements which are unavoidable impurities. Therefore, their contents are less than 0.05% for Ni, 0.05% for Cr, 0.02% for Mo, 0.03% for Cu, 0.007% for V, 0.0010% for B, 0.005% for S, 0.02% for P and 0.010% for N. The Nb content is limited to 0.05% and the Ti content is limited to 0.05% because above such values, large precipitates would form and the formability of the steel would decrease, making the 12% target for the total elongation more difficult to reach.

Hot rolled sheet having a thickness between 2 and 5 mm can be produced in a known manner from this steel. As an example, the reheating temperature before rolling can be between 1200° C. and 1280° C., preferably about 1250° C., the finish rolling temperature is preferably less than 850° C., the start cooling temperature less than 800° C., the stop cooling temperature between 570° C. and 590° C. and the coiling is performed at a temperature preferably comprised between 500° C. and 730° C.

After hot rolling, the sheet is heat treated in order to reduce the strain in the steel and therefore improve the cold-rollability of the hot-rolled and coiled steel sheet.

According to a first embodiment, this heat-treatment is a batch annealing. In this embodiment, the hot-rolled and coiled steel sheet is batch annealed at a temperature between 500° C. and 650° C. for a time between 300 seconds and 12 hours, preferably for 4 hours to 12 hours.

According to a second embodiment, the heat-treatment is a slow cooling from the coiling temperature to the room temperature, at a cooling rate such that the sheet is cooled from the coiling temperature to the room temperature in a cooling time comprised between 5 and 7 days.

The hot rolled sheet can be pickled and cold rolled to obtain a cold rolled sheet having a thickness between 0.5 mm and 2.5 mm.

Then, the sheet is heat treated on a continuous annealing line.

The heat treatment comprises the steps of:
annealing the sheet at an annealing temperature $T_A$ such that, at the end of the annealing step, the steel has a structure comprising at least 80% austenite, preferably at least 95%, and up to 100%. One skilled in the art knows how to determine the annealing temperature $T_A$ from dilatometry tests. Preferably, the annealing temperature $T_A$ is at most Ac3+50° C., in order to limit the coarsening of the austenitic grains. Still preferably, the annealing temperature $T_A$ is at most Ac3. Ac3 designates the temperature of start and the end of the transformation into austenite during the heating step. The sheet is maintained at the annealing temperature, i.e. maintained between $T_A$−5° C. and $T_A$+10° C., for an annealing time $t_A$ sufficient to homogenize the chemical composition. This annealing time $t_A$ is preferably more than 60 s but does not need to be of more than 300 s;

quenching the sheet down to a quenching temperature QT lower than the Ms transformation point of the austenite, at a cooling rate fast enough to avoid the formation of new ferrite and bainite. The cooling rate is comprised between 20° C./s and 50° C./s. Indeed, a cooling rate lower than 20° C./s would lead to the formation of ferrite and would not allow obtaining a tensile strength of at least 1180 MPa. The quenching temperature is between 240° C. and 320° C. in order to have a structure containing between 10 and 40% of austenite, between 60% and 90% of martensite and between 0% and 20% of ferrite, at that temperature QT just after cooling. If the quenching temperature QT is lower than 240° C., the fraction of the partitioned martensite in the final structure is too high to stabilize a sufficient amount of retained austenite above 9%, so that the total elongation does not reach 12%. Moreover, if the quenching temperature QT is higher than 320° C., the fraction of partitioned martensite is too low to obtain the desired tensile and yield strengths;

optionally holding the quenched sheet at the quenching temperature for a holding time comprised between 2 s and 8 s, preferably between 3 s and 7 s;

reheating the sheet from the quenching temperature up to a partitioning temperature PT between 400° C. and 465° C. The reheating rate can be high when the reheating is made by induction heater. If the partitioning temperature PT is lower than 400° C., the elongation is not satisfactory;

maintaining the sheet at the partitioning temperature PT for a time between 50 s and 250 s; and immediately after this maintaining step, cooling the sheet to the room temperature, at a cooling speed preferably higher than 1° C./s, for example between 2° C./s and 20° C./s.

In addition, when the quenching temperature QT is comprised between 240° C. and 270° C., the partitioning temperature PT is comprised between 440° C. and 460° C. This first embodiment allows reaching the aimed mechanical properties for a given composition over a very wide range of annealing and partitioning times, and therefore is very stable when the line speed is varied. In particular, this first embodiment provides a heavy tempering of the martensite, which results in high values of the yield strength and of the hole expansion ratio.

If the quenching temperature QT is comprised between 290° C. and 320° C., the partitioning temperature PT is comprised between 390° C. and 425° C. This second embodiment allows obtaining the aimed mechanical properties over a wide range of annealing and partitioning times.

In addition, these two embodiments allow achieving a total elongation of at least 14%, as described in further details herebelow.

This treatment allows obtaining a final structure i.e. after partitioning and cooling to the room temperature, consisting of:
retained austenite, with a surface percentage comprised between 9% and 13%, martensite and bainite, with a surface percentage between 71% and 91%, preferably between 82% and 91%, at most 20% of ferrite, preferably at most 5%.

A fraction of retained austenite of at least 9% allows obtaining a total elongation of at least 12%, and a fraction of martensite and bainite of at least 71% allows obtaining a tensile strength of at least 1180 MPa.

The retained austenite may comprise blocky retained austenite and film-type retained austenite, located between martensite laths.

The blocky type retained austenite has an average aspect ratio comprised between 2 and 4. The film-type retained austenite has an average aspect ratio comprised between 5 and 8.

The aspect ratios of each of the blocky-type and film-type retained austenite is determined on the final sheet by etching with Klemm agent, then observing at least 10 micrographs with a magnification of 500 and performing image analysis of the micrographs for the identification of N constituents (i) of retained austenite. The maximal $(Imax)_i$ and minimal $(Imin)_i$ sizes of each constituent (i) are determined, and the aspect ratio of each individual constituent (i) is calculated as $(Imax)_i/(Imin)_i$, in the total population of N constituents. The average aspect ratio is calculated as the arithmetical mean value of the N individual values of $(Imax)_i/(Imin)_i$.

Preferably, the microstructure comprises between 5.5% and 10.5% of film-type retained austenite, and at most 7.5% of blocky-type austenite. Film-type retained austenite is more stable than blocky-austenite, and does not quickly transform to martensite during deformation.

These features are especially obtained when the quenching temperature QT is comprised between 240° C. and 270° C. and the partitioning temperature PT is comprised between 440° C. and 460° C., or when the quenching temperature QT is comprised between 290° C. and 320° C., and the partitioning temperature PT is comprised between 390° C. and 425° C.

These features make it possible to obtain a total elongation TE of at least 14%, in combination with a yield strength YS comprised between 850 and 1100 MPa, a tensile strength of at least 1180 MPa and a hole expansion ratio HER according to the ISO standard 16630:2009 of at least 30%.

Moreover, the average size of the blocks of bainite or martensite is preferably of 10 μm or less.

Furthermore, this treatment allows obtaining an increased C content in the retained austenite, which is of at least 0.9%, preferably even of at least 1.0%, and up to 1.2%.

With such treatment, sheets having a yield strength YS comprised between 850 and 1100 MPa, a tensile strength of at least 1180 MPa, a total elongation of at least 12% and a hole expansion ratio HER according to the ISO standard 16630:2009 of at least 30% can be obtained.

Furthermore, when the quenching temperature QT is comprised between 240° C. and 270° C. and the partitioning temperature PT is comprised between 440° C. and 460° C., or when the quenching temperature QT is comprised between 290° C. and 320° C. and the partitioning temperature PT is comprised between 390° C. and 425° C., sheets having a yield strength YS comprised between 850 and 1100 MPa, a tensile strength of at least 1180 MPa, a total elongation of at least 14% and a hole expansion ratio HER according to the ISO standard 16630:2009 of at least 30% are obtained.

The steel sheets thus obtained can be used as uncoated sheets or can be coated with a metallic coating such as zinc or zinc alloy, produced by electroplating or vacuum deposition.

Sheets made of a steel having a composition comprising 0.163% of C, 2.05% of Si, 2.7% of Mn, and 0.02% of Al, the remainder being Fe and impurities, were produced by hot rolling, followed by coiling at 730° C. The hot rolled sheets were batch annealed at 650° C. for 10 hours, then pickled and cold rolled to obtain sheets having a thickness of 1.6 mm. The Ac1, Ac3 and Ms points of the steel were determined by dilatometry tests, as being Ac1=780° C., Ac3=900° C. and Ms=330° C.

Several sheets were heat treated by annealing at a temperature $T_A$ for a time $t_A$, quenching at a temperature QT at a cooling rate of 45° C./s, reheated to a partitioning temperature PT and maintained at the partitioning PT for a partitioning time Pt, then immediately cooled to room temperature.

In the tables below, $T_A$ is the annealing temperature, $t_A$ is the annealing time, QT the quenching temperature, PT the partitioning temperature, Pt the maintaining time at the partitioning temperature, YS the yield strength, TS the tensile strength, UE the uniform elongation, TE the total elongation and HER the hole expansion ratio measured according to the ISO standard. RA is the fraction of retained austenite in the microstructure, and $C_{RA}$% is the C content in the retained austenite. The column "Blocky and film-type RA?" indicates whether the structure comprises blocky and film type retained austenite.

All examples are related to uncoated sheets.

The heat treatment conditions and the obtained properties are reported in table I.

The values underlined are not according to the invention.

TABLE I

| Example | $T_A$ (° C.) | $t_A$ (s) | QT (° C.) | PT (° C.) | Pt (s) | YS (MPa) | TS (MPa) | UE (%) | TE (%) | HER (%) | RA (%) | Blocky and film-type RA? | $C_{RA}$ % |
|---|---|---|---|---|---|---|---|---|---|---|---|---|---|
| 1 | 880 | 120 | 225 | 400 | 100 | 1115 | 1283 | 3.2 | 3.9 | 40 | 7.2 | No | 1.27 |
| 2 |  | 120 | 275 |  |  | 1096 | 1286 | 8.2 | 12.8 | 39 | 9.1 | No | 1.03 |
| 3 |  | 120 | 300 |  |  | 833 | 1268 | 10 | 14.5 | 38 | 10.8 | Yes | 1.02 |
| 4 |  | 120 | 325 |  |  | 900 | 1280 | 9.9 | 14.5 | 28 | 10.1 | No | 1.01 |
| 5 |  | 120 | 300 | 400 | 100 | 833 | 1268 | 10 | 14.5 | 38 | 10.8 | Yes | 1.02 |
| 6 |  | 120 |  | 425 |  | 1002 | 1245 | 10.5 | 15.4 | 30 | 12 | Yes | 0.97 |
| 7 |  | 120 |  | 475 |  | 921 | 1227 | 10.8 | 14.6 | 29 | 11.7 | No | 0.94 |
| 8 |  | 100 | 250 | 460 | 50 | 1095 | 1220 | 10 | 15.5 | nd | nd | Yes | nd |
| 9 |  | 100 |  |  | 80 | 1095 | 1220 | 9 | 14 | nd | nd | Yes | nd |
| 10 |  | 100 |  |  | 150 | 1095 | 1220 | 9.5 | 15.3 | nd | nd | Yes | nd |
| 11 |  | 100 |  |  | 200 | 1080 | 1220 | 10 | 15 | nd | nd | Yes | nd |

Examples 1 to 4 show that only a quenching temperature between 240° C. and 320° C. allows obtaining a yield strength between 830 and 1100 MPa, a tensile strength of at least 1180 MPa, a total elongation of at least 12% and a hole expansion ratio of at least 30%.

The comparison of examples 5 to 7 shows that only a partitioning temperature PT comprised between 400° C. and 465° C. allows obtaining a yield strength between 830 and 1100 MPa, a tensile strength of at least 1180 MPa, a total elongation of at least 12% and a hole expansion ratio of at least 30%, whereas a partitioning temperature PT above 465° C. leads to the formation of a high fraction of fresh martensite, which leads to a hole expansion ratio below 30%.

These examples 1 to 7 further show that when the quenching temperature QT is comprised between 290° C. and 320° C. and the partitioning temperature PT is comprised between 400° C. and 425° C., a total elongation of more than 14% can be reached. By contrast, example 2, quenched at a temperature of 275° C., does not reach a total elongation of 14%.

Examples 8 to 11 show that the targeted properties can be obtained over a wide range of partitioning times, and more specifically that the mechanical properties obtained are very stable when the partitioning time is changed.

Among examples 1-11, only examples 3, 5, 6 and 8-11 comprise blocky retained austenite having an aspect ratio comprised between 2 and 4 and film-type retained austenite having an aspect ratio comprised between 5 and 8. The surface fraction of film-type retained austenite, with respect to the whole microstructure, is comprised between 5.5% and 10.5% for examples 3, 5, 6 and 8-11. By contrast, examples 1, 2, 4 and 7 comprise only blocky retained austenite.

These examples further show that when the quenching temperature QT is comprised between 240° C. and 270° C., and the partitioning temperature PT is comprised between 440° C. and 460° C., a total elongation of at least 14% is obtained.

In addition, these examples show that when the quenching temperature QT is comprised between 240° C. and 270° C., and the partitioning temperature PT is comprised between 440° C. and 460° C., very high values of yield strength can be obtained. These high values are due to an important tempering of the martensite, owing to the low value of the quenching temperature QT and to the high value of the partitioning temperature PT.

Further tests were performed to study the influence of the line speed on the mechanical properties of the sheet during the manufacture, i.e. the stability of these mechanical properties with variations of the line speed.

These tests were performed on a line having a minimum line speed of 50 m/min and a maximum line speed of 120 m/min, with soaking and partitioning sections configured so that the maximum soaking time and partitioning time, reached with the minimum line speed, are respectively of 188 s and 433 s. The minimum soaking time and partitioning time, reached with the maximum line speed, are respectively 79 s and 181 s.

The tests were performed using the minimum and the maximum line speeds, with a quenching temperature QT of 250° C. and a partitioning temperature PT of 450° C., or a quenching temperature QT of 300° C. and a partitioning temperature PT of 400° C.

The heat treatment conditions and the obtained properties are reported in table II.

TABLE II

| Example | $T_A$ (° C.) | $t_A$ (s) | QT (° C.) | PT (° C.) | Pt (s) | YS (MPa) | TS (MPa) | UE (%) | TE (%) | HER (%) |
|---|---|---|---|---|---|---|---|---|---|---|
| 12 | 870 | 80 | 250 | 450 | 181 | 974 | 1205 | 10.2 | 14.9 | 50 |
| 13 |  | 188 | 250 | 450 | <u>433</u> | 903 | 1212 | 10.9 | 16.2 | 46 |
| 14 |  | 80 | 300 | 400 | 181 | 883 | 1231 | 10.5 | 15.2 | 37 |
| 15 |  | 188 | 300 | 400 | <u>433</u> | <u>794</u> | 1220 | 10.3 | 14.6 | 31 |

These results show that with a quenching temperature QT of 250° C. and a partitioning temperature PT of 450° C., the line speed has little influence on the quality of the mechanical properties obtained, so that the targeted properties can be obtained throughout the whole range of line speeds. These results also show that the manufacturing process is very robust with regard to variations of the line speed.

The results obtained with a quenching temperature QT of 300° C. and a partitioning temperature PT of 400° C. are similar, even if the yield strength is slightly lower than the targeted value of 850 MPa when the line speed is too slow and the partitioning temperature consequently longer than 250 s.

These results further show that when the quenching temperature QT is comprised between 290° C. and 320° C. and the partitioning temperature PT is comprised between 400° C. and 425° C., or when the quenching temperature QT is comprised between 240° C. and 270° C., and the partitioning temperature PT is comprised between 440° C. and 460° C., a total elongation of more than 14% can be reached.

Tests were further performed to assess the effect of the heat-treatment performed between the coiling and the cold-rolling steps.

The tests were performed with a heat-treatment comprises batch annealing at a temperature of 650° C. (Heat-treatment 1), or with a heat-treatment comprising slow cooling of the hot-rolled steel sheet from the coiling temperature to room temperature for a time of 7 days (Heat-treatment 2).

Tests 16 to 19 in Table III below were performed with a quenching temperature QT of 250° C. and a partitioning temperature PT of 460° C., the partitioning time being either 150 s (examples 16 and 17) or 200 s (examples 18 and 19).

Tests 20 to 23 in Table III were performed with a quenching temperature QT of 300° C. and a partitioning temperature PT of 400° C., the partitioning time being either 150 s (examples 20 and 21) or 200 s (examples 22 and 23).

| Example | Heat-treatment | $T_A$ (° C.) | $t_A$ (s) | QT (° C.) | PT (° C.) | Pt (s) | YS (MPa) | TS (MPa) | UE (%) | TE (%) | HER (%) |
|---|---|---|---|---|---|---|---|---|---|---|---|
| 16 | 1 | 880 | 100 | 250 | 460 | 150 | 1095 | 1222 | 9.5 | 15.8 | 71 |
| 17 | 2 |  | 100 | 250 | 460 | 150 | 1064 | 1216 | 10.3 | 15.1 | 56 |
| 18 | 1 |  | 100 | 250 | 460 | 200 | 1048 | 1223 | 10.1 | 14.3 | 67 |
| 19 | 2 |  | 100 | 250 | 460 | 200 | 1065 | 1231 | 10.5 | 16.3 | 52 |
| 20 | 1 |  | 100 | 300 | 400 | 150 | 1044 | 1255 | 9.1 | 14.3 | 54 |

-continued

| Example | Heat-treatment | $T_A$ (° C.) | $t_A$ (s) | QT (° C.) | PT (° C.) | Pt (s) | YS (MPa) | TS (MPa) | UE (%) | TE (%) | HER (%) |
|---|---|---|---|---|---|---|---|---|---|---|---|
| 21 | 2 | | | 100 | 300 | 400 | 150 | 1033 | 1258 | 9.7 | 14.9 | 36 |
| 22 | 1 | | | 100 | 300 | 400 | 200 | 1038 | 1251 | 10.2 | 14.5 | 52 |
| 23 | 2 | | | 100 | 300 | 400 | 200 | 1062 | 1253 | 9.1 | 14.0 | 30 |

Examples 16-23 comprise blocky retained austenite having an aspect ratio comprised between 2 and 4 and film-type retained austenite having an aspect ratio comprised between 5 and 8, the surface fraction of film-type retained austenite, with respect to the whole microstructure, being comprised between 5.5% and 10.5%.

These tests show that the targeted mechanical properties are obtained by a process according to the invention if the heat-treatment performed between the coiling and the cold-rolling steps is a batch annealing or a slow cooling.

These tests further confirm that a quenching temperature QT comprised between 240° C. and 270° C. and a partitioning temperature PT comprised between 440° C. and 460°, or a quenching temperature QT comprised between 290° C. and 320° C., and a partitioning temperature PT comprised between 400° C. and 425° C., allow obtaining very satisfactory mechanical properties, in particular a total elongation of more than 14%.

Tests were also performed to determine the minimum cooling rate for the quenching to the quenching temperature QT.

The heat treatment conditions and the obtained properties are reported in table IV.

In this table, CR designates the cooling rate.

TABLE IV

| Example | $T_A$ (° C.) | $t_A$ (s) | CR (° C./s) | QT (° C.) | PT (° C.) | Pt (s) | YS (MPa) | TS (MPa) | UE (%) | TE (%) | HER (%) |
|---|---|---|---|---|---|---|---|---|---|---|---|
| 24 | 880 | 100 | 16 | 250 | 460 | 150 | 895 | <u>1173</u> | 11.2 | 15.7 | 38 |
| 25 | | 100 | 20 | 250 | 460 | 150 | 908 | 1195 | 10.4 | 15.2 | 31 |
| 26 | | 100 | 30 | 250 | 460 | 150 | 897 | 1202 | 11.3 | 16.1 | 34 |
| 27 | | 100 | 50 | 250 | 460 | <u>433</u> | 1089 | 1221 | 9.8 | 14.8 | 51 |

These results show that when the cooling rate is below 20° C./s, a tensile strength of less than 1180 MPa is obtained, whereas the mechanical properties are satisfactory when the cooling rate is comprised between 20° C./s and 50° C./s.

What is claimed is:

1. A method for producing an uncoated steel sheet having a microstructure consisting of, in surface percentage, between 71% and 91% of a sum of martensite and bainite, between 9% and 13% retained austenite, and at most 20% ferrite, the method comprising the following successive steps:
   providing a cold-rolled steel sheet, made of a steel having a chemical composition containing by weight:
   0.13%≤C≤0.22%,
   1.2%≤Si≤2.3%,
   0.02%≤Al≤1.0%,
   with 1.25%≤Si+Al≤2.35%,
   2.4%≤Mn 3%,
   Ti≤0.05%
   Nb≤0.05%, and
   a remainder, the remainder including Fe and unavoidable impurities;
   annealing the steel sheet at an annealing temperature $T_A$ so as to obtain a structure comprising from 80% to 100% austenite and from 0% to 20% ferrite;
   quenching the steel sheet at a cooling rate between 20° C./s and 50° C./s down to a quenching temperature QT between 240° C. and 270° C.;
   heating the steel sheet up to a partitioning temperature PT between 440° C. and 460°;
   maintaining the steel sheet at the partitioning temperature PT for a partitioning time Pt between 50 s and 250 s; and
   immediately after the maintaining step, cooling the steel sheet down to room temperature,
   wherein the retained austenite comprises blocky retained austenite having an aspect ratio between 2 and 4 and film-type retained austenite having an aspect ratio between 5 and 8,
   the steel sheet having a yield strength between 850 and 1100 MPa, a tensile strength of at least 1180 MPa, a total elongation of at least 14% and a hole expansion ratio HER of at least 30%.

2. A method for producing an uncoated steel sheet having a microstructure consisting of, in surface percentage, between 71% and 91% of a sum of martensite and bainite, between 9% and 13% retained austenite, and at most 20% ferrite, wherein the method comprises the following successive steps:
   providing a cold-rolled steel sheet, made of a steel having a chemical composition containing by weight:
   0.13%≤C≤0.22%,
   1.2%≤Si≤2.3%,
   0.02%≤Al≤1.0%,
   with 1.25%≤Si+Al≤2.35%,
   2.4%≤Mn 3%,
   Ti≤0.05%,
   Nb≤0.05%, and
   a remainder, the remainder including Fe and unavoidable impurities;
   annealing the steel sheet at an annealing temperature $T_A$ so as to obtain a structure comprising from 80% to 100% austenite and from 0% to 20% ferrite;
   quenching the steel sheet at a cooling rate between 20° C./s and 50° C./s down to a quenching temperature QT between 290° C. and 320° C.;
   heating the steel sheet up to a partitioning temperature PT between 400° C. and 425° C.;

maintaining the steel sheet at the partitioning temperature PT for a partitioning time Pt between 50 s and 250 s; and immediately cooling the steel sheet down to room temperature, wherein the retained austenite comprises blocky retained austenite having an aspect ratio between 2 and 4 and film-type retained austenite having an aspect ratio between 5 and 8, the steel sheet having a yield strength between 850 and 1100 MPa, a tensile strength of at least 1180 MPa, a total elongation of at least 14% and a hole expansion ratio HER of at least 30%.

3. The method according to claim 1, wherein the step of providing the cold-rolled steel sheet comprises:

hot rolling a sheet made of said steel to obtain a hot rolled steel sheet;

coiling the hot-rolled steel sheet at a coiling temperature Tc between 500° C. and 730° C.; and cold rolling the hot-rolled steel sheet to obtain the cold-rolled steel sheet.

4. The method according to claim 3, wherein the step of providing the cold-rolled steel sheet further comprises, between the coiling and the cold-rolling, performing a batch annealing at a batch annealing temperature between 500° C. and 650° C. for a batch annealing time between 300 seconds and 12 hours.

5. The method according to claim 3, wherein the step of providing the cold-rolled steel sheet further comprises, between the coiling and the cold-rolling, performing a slow cooling of the hot-rolled steel sheet from the coiling temperature to a room temperature for a time between 5 and 7 days.

6. The method according to claim 1, wherein the steel sheet has, after the quenching and just before the heating to the partitioning temperature PT, a microstructure consisting of 10% and 40% austenite, between 60% and 90% martensite, and between 0% and 20% ferrite.

7. The method according to claim 1, wherein the chemical composition of the steel contains by weight:
0.13%≤C≤0.22%,
1.2%≤Si≤2.3%,
0.02%≤Al≤1.0%,
with 1.25%≤Si+Al≤2.35%,
2.4%≤Mn 3%,
Ti≤0.05%
Nb≤0.05%, and
a remainder, the remainder including Fe and unavoidable impurities;
and further satisfies at least one of the following conditions:
C≥0.16%;
C≤0.20%;
Si≥2.0%;
Si≤2.2%;
Mn≥2.6%; and
Mn≤2.8%.

8. The method according to claim 1, wherein, after the steel sheet is quenched to the quenching temperature QT and before the steel sheet is heated to the partitioning temperature PT, the steel sheet is held at the quenching temperature QT for a holding time between 2 s and 8 s.

9. The method according to claim 1, wherein the partitioning time Pt is between 50 and 200 s.

10. The method according to claim 1, wherein the microstructure comprises between 5.5% and 10.5% of the film-type retained austenite.

11. An uncoated steel sheet, wherein the uncoated steel sheet is made of a steel having a chemical composition containing by weight:
0.13%≤C≤0.22%,
1.2%≤Si≤2.3%,
0.02%≤Al≤1.0%,
with 1.25%≤Si+Al≤2.35%,
2.4%≤Mn 3%,
Ti≤0.05%,
Nb≤0.05%, and
a remainder, the remainder including Fe and unavoidable impurities;
the uncoated steel sheet having a microstructure consisting of, in surface percentage:
between 71% and 91% martensite and bainite;
between 9% and 13% retained austenite; and
at most 20% ferrite,
wherein the retained austenite comprises blocky retained austenite having an aspect ratio between 2 and 4 and film-type retained austenite having an aspect ratio between 5 and 8,
the uncoated steel sheet having a yield strength between 850 and 1100 MPa, a tensile strength of at least 1180 MPa, a total elongation of at least 14% and a hole expansion ratio HER of at least 30%.

12. The uncoated steel sheet according to claim 11, wherein the hole expansion ratio HER is greater than 40%.

13. The uncoated steel sheet according to claim 11, wherein the chemical composition of the steel contains by weight:
0.13%≤C≤0.22%,
1.2%≤Si≤2.3%,
0.02%≤Al≤1.0%,
with 1.25%≤Si+Al≤2.35%,
2.4%≤Mn 3%,
Ti≤0.05%,
Nb≤0.05%, and
a remainder, the remainder including Fe and unavoidable impurities;
and further satisfies at least one of the following conditions:
C≥0.16%;
C≤0.20%;
Si≥2.0%;
Si≤2.2%;
Mn≥2.6%; and
Mn≤2.8%.

14. The uncoated steel sheet according to claim 11, wherein the retained austenite has a C content $C_{RA}$% between 0.9% and 1.2%.

15. The uncoated steel sheet according to claim 11, wherein the microstructure comprises between 5.5% and 10.5% of the film-type retained austenite.

16. A steel sheet wherein the steel sheet is made of a steel having a chemical composition containing by weight:
0.13%≤C≤0.22%,
1.2%≤Si≤2.3%,
0.02%≤Al≤1.0%,
with 1.25%≤Si+Al≤2.35%,
2.4%≤Mn 3%,
Ti≤0.05%,
Nb≤0.05%, and
a remainder, the remainder including Fe and unavoidable impurities;
the steel sheet having a microstructure consisting of, in surface percentage:
between 71% and 91% martensite and bainite;
between 9% and 13% retained austenite; and
at most 20% ferrite, wherein the retained austenite comprises blocky retained austenite having an aspect ratio between 2 and 4 and film-type retained austenite having an aspect ratio between 5 and 8, the steel sheet having a yield strength between 850 and 1100 MPa, a tensile strength of at least 1180 MPa, a total elongation of at least 14% and a hole expansion ratio HER of at least 30%, and the steel sheet being coated with a metallic coating fabricated by electroplating or vacuum deposition process.

17. The steel sheet according to claim 16, wherein the hole expansion ratio HER is greater than 40%.

18. The steel sheet according to claim 16, wherein the chemical composition of the steel contains by weight:
0.13%≤C≤0.22%,
1.2%≤Si≤2.3%,
0.02%≤Al≤1.0%,
with 1.25%≤Si+Al≤2.35%,
2.4%≤Mn 3%,
Ti≤0.05%,
Nb≤0.05%, and
a remainder, the remainder including Fe and unavoidable impurities;
and further satisfies at least one of the following conditions:
C≥0.16%;
C≤0.20%;
Si≥2.0%;
Si≤2.2%;
Mn≥2.6%; and
Mn≤2.8%.

19. The steel sheet according to claim 16, wherein the retained austenite has a C content $C_{RA}$% between 0.9% and 1.2%.

20. The steel sheet according to claim 16, wherein the microstructure comprises between 5.5% and 10.5% of the film-type retained austenite.

21. The method according to claim 2, wherein the step of providing the cold-rolled steel sheet comprises:
hot rolling a sheet made of said steel to obtain a hot rolled steel sheet;
coiling the hot-rolled steel sheet at a coiling temperature Tc between 500° C. and 730° C.; and
cold rolling the hot-rolled steel sheet to obtain the cold-rolled steel sheet.

22. The method according to claim 21, wherein the step of providing the cold-rolled steel sheet further comprises, between the coiling and the cold-rolling, performing a batch annealing at a batch annealing temperature between 500° C. and 650° C. for a batch annealing time between 300 seconds and 12 hours.

23. The method according to claim 21, wherein the step of providing the cold-rolled steel sheet further comprises, between the coiling and the cold-rolling, performing a slow cooling of the hot-rolled steel sheet from the coiling temperature to a room temperature for a time between 5 and 7 days.

24. The method according to claim 2, wherein the steel sheet has, after the quenching and just before the heating to the partitioning temperature PT, a microstructure consisting of between 10% and 40% austenite, between 60% and 90% martensite, and between 0% and 20% ferrite.

25. The method according to claim 2, wherein the chemical composition of the steel contains by weight:
0.13%≤C≤0.22%,
1.2%≤Si≤2.3%,
0.02%≤Al≤1.0%,
with 1.25%≤Si+Al≤2.35%,
2.4%≤Mn 3%,
Ti≤0.05%,
Nb≤0.05%, and
a remainder, the remainder including Fe and unavoidable impurities;
and further satisfies at least one of the following conditions:
C≥0.16%;
C≤0.20%;
Si≥2.0%;
Si≤2.2%;
Mn≥2.6%; and
Mn≤2.8%.

26. The method according to claim 2, wherein, after the steel sheet is quenched to the quenching temperature QT and before the steel sheet is heated to the partitioning temperature PT, the steel sheet is held at the quenching temperature QT for a holding time between 2 s and 8 s.

27. The method according to claim 2, wherein the partitioning time Pt is between 50 and 200 s.

28. The method according to claim 2, wherein the microstructure comprises between 5.5% and 10.5% of the film-type retained austenite.

* * * * *